(12) United States Patent
Hughes, Jr. et al.

(10) Patent No.: US 12,492,684 B1
(45) Date of Patent: Dec. 9, 2025

(54) SOLID-STATE ENERGY HARVESTER

(71) Applicant: Mueller International, LLC, Atlanta, GA (US)

(72) Inventors: David Latimore Hughes, Jr., Signal Mountain, TN (US); Daryl Lee Gibson, Chattanooga, TN (US); Timothy Bain Ervin, Apison, TN (US)

(73) Assignee: Mueller International, LLC, Atlanta, GA (US)

( * ) Notice: Subject to any disclaimer, the term of this patent is extended or adjusted under 35 U.S.C. 154(b) by 4 days.

(21) Appl. No.: 18/955,040

(22) Filed: Nov. 21, 2024

(51) Int. Cl.
*F03G 7/00* (2006.01)
*F03G 7/06* (2006.01)

(52) U.S. Cl.
CPC ............ *F03G 7/008* (2021.08); *F03G 7/0252* (2021.08); *F03G 7/029* (2021.08); *F03G 7/061* (2021.08)

(58) Field of Classification Search
CPC ........ F03G 7/061; F03G 7/0252; F03G 7/008; H02N 2/18; H02N 2/188; H02N 2/186; H01L 41/08; H10N 30/30; H10N 30/50; H10N 30/857; H10N 30/8554; H10N 30/8536
USPC ........... 60/639; 310/339; 322/3, 2 R; 290/54
See application file for complete search history.

(56) References Cited

U.S. PATENT DOCUMENTS

| | | | | |
|---|---|---|---|---|
| 6,011,346 A * | 1/2000 | Buchanan | ............ | H02N 2/185 310/339 |
| 2009/0189485 A1* | 7/2009 | Iyoki | .................. | H10N 30/2027 310/317 |
| 2010/0309061 A1* | 12/2010 | Sinha | ....................... | H01Q 1/24 310/366 |
| 2012/0032560 A1* | 2/2012 | Ochoa | ................. | E21B 41/0085 310/339 |
| 2014/0042751 A1* | 2/2014 | Fyfe | ....................... | H02N 2/185 290/54 |
| 2016/0164437 A1* | 6/2016 | Kim | ....................... | H02N 2/185 310/339 |
| 2019/0104979 A1* | 4/2019 | Dagdeviren | ......... | H10N 30/877 |

OTHER PUBLICATIONS

Medeiros et al., Flowmeter based on a piezoelectric PVDF tube, 2019, Elsevier, pp. 368-378 (Year: 2019).*

* cited by examiner

*Primary Examiner* — Mark A Laurenzi
*Assistant Examiner* — Kelsey L Stanek
(74) *Attorney, Agent, or Firm* — Taylor Duma LLP

(57) ABSTRACT

Apparatuses for utilizing transient pressures inherent in water mains to generate electrical power and methods of using the same. A solid-state energy harvester device comprises a cylindrical body configured to be installed inline with a fluid-carrying pipe system and defining a fluid path, a flexible sleeve disposed inside the cylindrical body and encompassing the fluid path, and a plurality of piezoelectric elements integrated into the flexible sleeve. The cylindrical body, flexible sleeve, and plurality of piezoelectric elements are configured such that transient pressures in the fluid flowing through the fluid path cause the flexible sleeve to flex and bend, exciting the plurality of piezoelectric elements to produce an electric current.

19 Claims, 4 Drawing Sheets

SOLID-STATE ENERGY HARVESTER

BRIEF SUMMARY

The present disclosure relates to technologies for utilizing transient pressures inherent in water mains to generate electrical power. According to embodiments, a solid-state energy harvester device comprises a cylindrical body defining a fluid path, a flexible sleeve disposed inside the cylindrical body and encompassing the fluid path, and a plurality of piezoelectric elements integrated into the flexible sleeve. The cylindrical body, flexible sleeve, and plurality of piezoelectric elements are configured such that transient pressures in a fluid flowing through the fluid path cause the flexible sleeve to flex and bend, exciting the plurality of piezoelectric elements to produce an electric current.

According to further embodiments, an apparatus comprises a cylindrical body, a flexible sleeve, and one or more energy generation components. The cylindrical body is configured to be installed inline in a fluid-carrying pipe system and defines a fluid path through which the fluid flows. The flexible sleeve is disposed inside the cylindrical body and encompasses the fluid path. The cylindrical body further defines a cylindrical cavity between a portion of the flexible sleeve and an inside wall of the cylindrical body that is configured to promote a pressure differential between an inner surface of the flexible sleeve adjacent to the fluid path and an outer surface of the flexible sleeve adjacent to the cylindrical cavity. The one or more energy generation components are electrically-interconnected and integrated into the flexible sleeve. The cylindrical body, the flexible sleeve, and the one or more energy generation components are configured such that transient pressures in the fluid flowing through the fluid path cause the flexible sleeve to expand into and contract out of the cylindrical cavity imparting mechanical stresses in the one or more energy generation components causing the energy generation components to produce an electric current.

According to further embodiments, a method for utilizing a solid-state energy harvester to provide an electric current to an external electrical device comprises installing the solid-state energy harvester inline with a fluid-carrying pipe system, connecting an electrical conductor from the solid-state energy harvester to the external electrical device, and causing pressurized fluid to flow through the fluid-carrying pipe system. The solid-state energy harvester comprises a cylindrical body, a flexible sleeve, and one or more energy generation components. The cylindrical body defines a fluid path for conducting the fluid through the cylindrical body, and the ends of the cylindrical body are configured to be connected to pipes of the fluid-carrying pipe system. The flexible sleeve is disposed inside the cylindrical body and encompasses the fluid path. The cylindrical body further defines a cylindrical cavity between a portion of the flexible sleeve and an inside wall of the cylindrical body, the cylindrical cavity configured to promote a pressure differential between an inner surface of the flexible sleeve adjacent to the fluid path and an outer surface of the flexible sleeve adjacent to the cylindrical cavity. The one or more energy generation components are electrically-interconnected and integrated into the flexible sleeve. Transient pressures in the fluid flowing through the fluid path cause the flexible sleeve to expand into and contract out of the cylindrical cavity imparting mechanical stresses in the one or more energy generation components causing the energy generation components to produce the electric current. The electrical conductor is connected to the one or more energy generation components and passes through the cylindrical body to conduct the electric current from the one or more energy generation components to the external electrical device.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
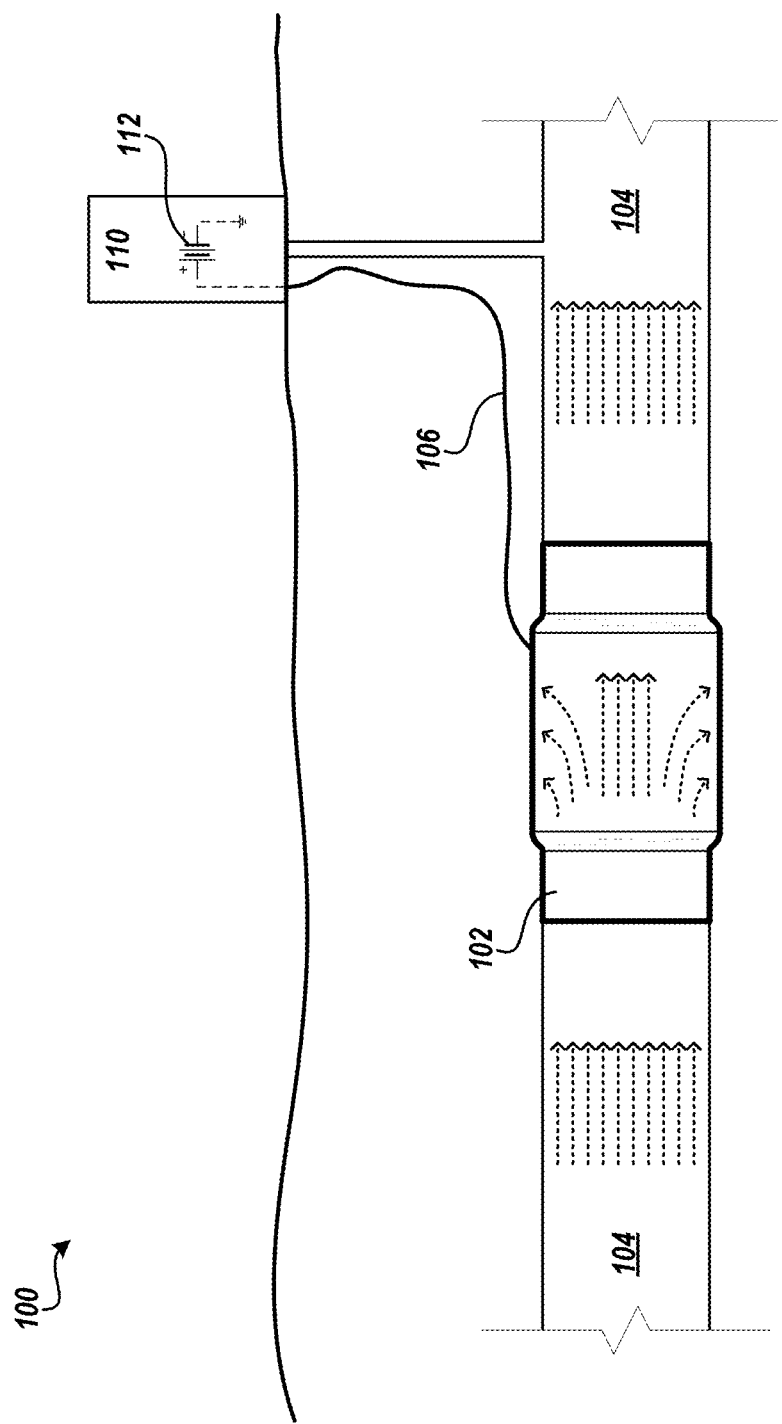
FIG. 1 is a block diagrams showing an illustrative environment in which an exemplary solid-state energy harvester may be implemented to provide power to electrical devices, according to embodiments presented herein.

The following detailed description is directed to technologies for generating electrical power from transient pressures inherent in water mains and other fluid distribution pipes without utilizing moving parts. In particular, apparatuses and methods are described for implementing and utilizing a solid-state energy harvester device installed inline with fluid-filled, pressurized pipes of a water distribution system to generate electricity for powering related equipment. Water utility companies deploy a myriad of electrically-powered devices and electronics to perform various functions of the water distribution process. This may include remotely-operated valves, usage meters, pressure transducers, flow sensors, water quality sensors, leak detectors, communication nodes, and the like. These devices may be buried with the pipes of the subterranean water distribution system or otherwise inaccessible. Some of these devices may be battery-powered, creating a limited lifespan for the device, while other devices may be powered by inline turbines or other mechanical power generation means that is prone to wear and failure.

According to embodiments described herein, a solid-state energy harvester device may be implemented that can be installed inline with the fluid-filled, pressurized pipes of a water distribution system, such as water mains, and take advantage of transient pressures inherent in the system to generate electricity without requiring any mechanical, moving parts. The generated electrical power can be used to power a variety of water system devices and electronics, such as directly powering the operation of sensors, recharging batteries for electrical devices, and the like. In addition, the design of the solid-state energy harvester device may allow the device to be used as a pressure transducer itself.

According to embodiments, the solid-state energy harvester device includes an cylindrical iron or plastic body formed to create a cylindrical cavity that promotes an area of pressure differential between the inner and outer surface of a flexible sleeve or liner disposed in the interior of the cylindrical body. The flexible sleeve incorporates a number of interconnected piezoelectric elements that generate an electrical charge in response to the mechanical stresses from the stretching and twisting of the flexible sleeve caused by the pressure differential across the sleeve. The piezoelectric elements may include individual elements, such as bending transducers, pressure transducer films, ribbon sensors, ceramic or composite strips, radial field diaphragms, and the like. In some embodiments, the piezoelectric elements may be over-molded by or sandwiched within material layers of the flexible sleeve. In other embodiments, the piezoelectric elements may be attached to the interior or exterior surface of the flexible sleeve.

According to further embodiments, the piezoelectric elements are integrated with the flexible sleeve in a structure to increase their available elastic range within the designated space. This may take the form of a string, spiral, matrix, lattice, or any other design that increases the electrical charge produced from the expansion and contraction of the sleeve within the cylindrical cavity. In other embodiments, the piezoelectric elements may include one or more piezoelectric film sheets or piezoelectric fibers integrated into or making up the structure of the flexible sleeve. The structure of the cylindrical body and cylindrical cavity may by designed to protect the flexible sleeve and piezoelectric elements from damage from over stretching.

Electrical power generated by the piezoelectric elements may be sent through one more conductors passing through an aperture or "access hole" in the plastic or ductile cylindrical body. For example, an electrical connector may be molded into the pipe wall. In other embodiments, electrical power may be passed through the wall of the cylindrical body via magnetic induction, thus eliminating a potential leak path. In further embodiments, the piezoelectric energy generation elements could be isolated from the water within the device. A compressible tube or pilot may be run from the fluid path of the cylindrical body to the piezoelectric elements to provide a mechanical advantage as well as protect the piezoelectric elements from tuberculation, chemicals, and other contaminants that could reduce their power generation efficiency or life.

In some embodiments, the solid-state energy harvester may be embodied as a stand-alone device. In other embodiments, the solid-state energy harvester may be integrated into existing water distribution components, such as a hydrant stem, valve structure, water meter, flushing device, or water sensor devices. Because the energy harvester uses solid-state piezoelectric or other mechanical energy harvesters for energy generation, there are no moving parts to fail and nothing impeding flow in the fluid path. Thus, even if the solid-state energy harvester were to stop producing electrical current, there would be no need to remove it. In further embodiments, in addition to electrical power generation, the design of the cylindrical body, cylindrical cavity, and flexible sleeve may allow the solid-state energy harvester to serve as a stand-alone water hammer reducer as well.

FIG. 1 and the following description are intended to provide a general description of suitable environments in which the embodiments described herein may be implemented. In particular, FIG. 1 shows an environment 100 in which an exemplary solid-state energy harvester may be utilized to provide power to one or more electrical devices, according to embodiments described herein. The environment 100 includes the solid-state energy harvester 102 installed inline in a water main 104 or other pipe system of a water distribution system. According to embodiments, pressurized fluid (e.g., water) flows through the water main 104 and the solid-state energy harvester 102, as further shown in FIG. 1.

In some embodiments, the water main 104 may be subterranean with the solid-state energy harvester 102 installed on the water main underground or in an accessible spot along the water main, such as a service pit. In further embodiments, the solid-state energy harvester 102 may be installed inline on a pipe extension from the water main 104, such as a service tap, hydrant riser, or the like. In yet further embodiments, the solid-state energy harvester 102 may be integrated in a water distribution component connected to the water main 104, such as a hydrant stem, valve structure, water meter, flushing device, water sensor, or the like.

According to embodiments, the solid-state energy harvester 102 generates electricity from the transient pressure changes in the fluid in the pressurized water main 104, and that electricity is provided to an electrical device 110. The electrical device 110 may represent a component of the water distribution system, such as a solid-state water meter, water quality testing station, flushing station, remotely-operated valve, communication node, and the like. In some embodiments, the electrical device 110 may be subterranean with the water main 104 or in a similarly inaccessible location requiring electrical power from the solid-state energy harvester 102 for operation or for charging an internal battery to prolong the life of the device. The solid-state energy harvester 102 may be connected to the electrical device 110 via a conductor 106 that provides transfer from the energy generation components of the harvester to the electrical circuitry of the device. For example, the solid-state energy harvester 102 may be connected by the conductor 106 to a battery charging circuit of the electrical device 110 in order to continuously trickle-charge a battery 112 of the device.

Figure 2:
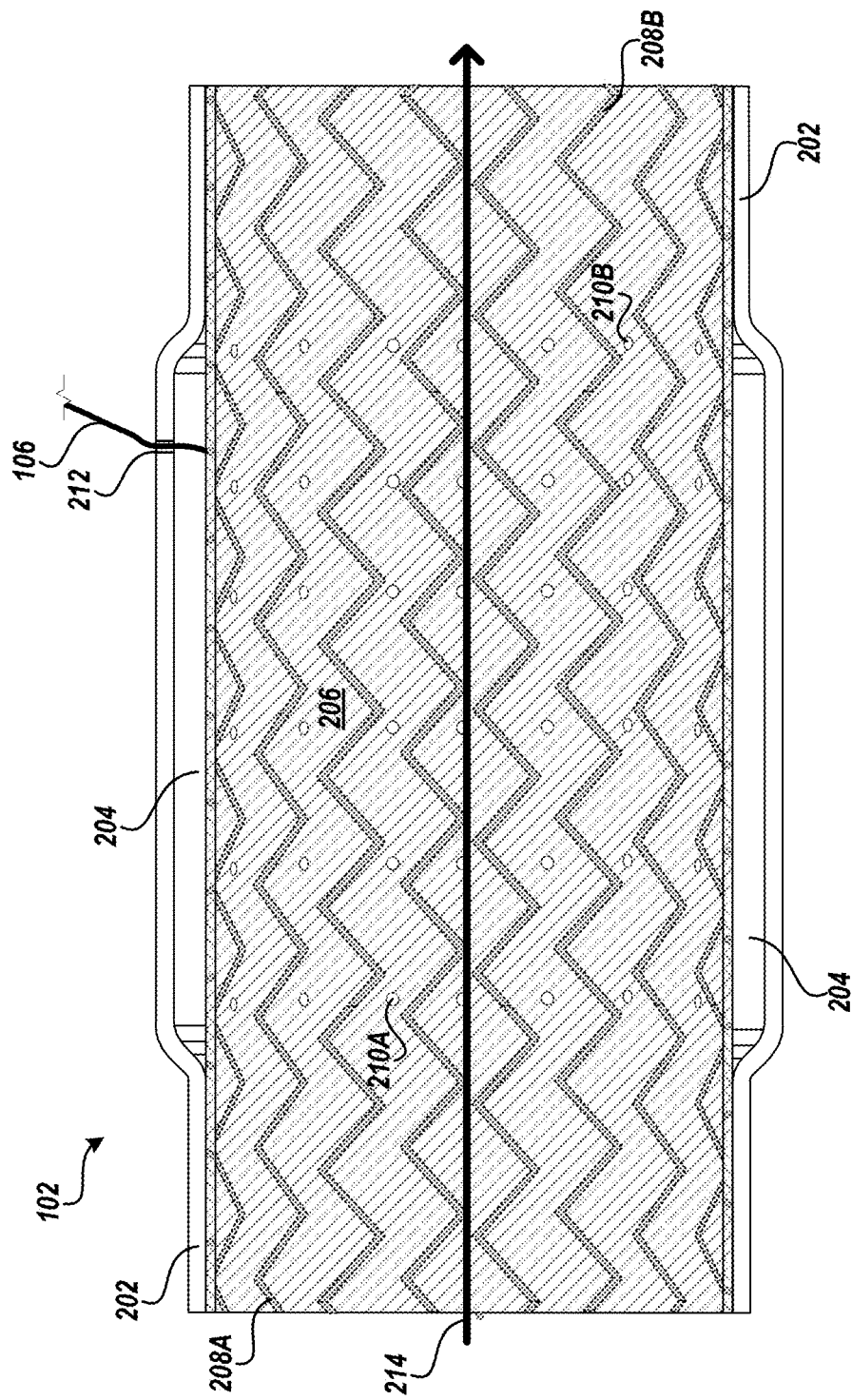
FIG. 2 is a cross-sectional view of an illustrative solid-state energy harvester device, according to embodiments presented herein.

FIG. 2 shows additional details of an exemplary solid-state energy harvester 102, according to some embodiments. The solid-state energy harvester 102 comprises a cylindrical body 202 defining a cylindrical fluid path 214 for the flow of water from the water main 104 through the device. The open ends of the cylindrical body 202 may be shaped or otherwise configured to allow inline installation of the solid-state energy harvester 102 in standard-sized water mains 104 or other pipe system of the water distribution system, such as a 6" diameter iron or C900 plastic (PVC) pipes, incorporating appropriate flanges or designed for attachment via associated pipe-couplings, for example. The solid-state energy harvester 102 further includes a flexible sleeve 206 installed concentrically with the cylindrical body 202 that encompasses the fluid path 214. The flexible sleeve 206 may be made of a flexible material, such as EDPM rubber, silicon rubber, neoprene, thermo-plastic elastomers (TPEs), or any suitable material known in the art providing elasticity, water tolerance, and resistance to tuberculation and build-up of deposits. In some embodiments, the flexible sleeve 206 may run substantially the entire axial-length of the cylindrical body 202. In other embodiments, the flexible sleeve 206 may run a portion of the length of the cylindrical body 202, or there may be multiple segments making up the flexible sleeve that together run a portion of or the entire length of the cylindrical body.

According to embodiments, the flexible sleeve 206 incorporates energy generation components, such as energy generation components 208A and 208B shown in FIG. 2 (referred to herein generally as "energy generation components 208"), embedded in or otherwise integrated with the structure of the sleeve. In some embodiments, the energy generation components 208 may comprise a number individual piezoelectric elements, such as bending transducers, pressure transducer films, ribbon sensors, ceramic or composite strips, radial field diaphragms, and the like, distributed throughout the flexible sleeve 206 and interconnected to form electrical pathways between and amongst the elements in the energy generation components 208. In some embodiments, the piezoelectric elements may be over-molded by or sandwiched within material layers of the flexible sleeve 206. In further embodiments, one or more piezoelectric elements, such as piezoelectric film sheets, piezoelectric fibers/ribbons, and the like, may comprise an integral part of the structure of the flexible sleeve 206. In other embodiments, the piezoelectric elements may be attached to the interior or exterior surface of the flexible sleeve. In yet further embodiments, the energy generation components 208 may comprise other mechanical energy harvester elements in addition to or alternatively to the piezoelectric elements, such as triboelectric nanogenerators, pyroelectric materials, magnetostrictive materials, and/or any other suitable elements for generation of electric current in response to mechanical deformation or stress.

As further shown in FIG. 2, the cylindrical body 202 may be shaped to form a cylindrical void or cavity 204 between the flexible sleeve 206 and the inner wall of the cylindrical body along a portion of its axial length. The cylindrical cavity 204 is further shown in the perspective view of FIG. 4A. According to embodiments, the shape and radius of the cylindrical cavity 204 in relation to the remainder of the cylindrical body 202 is formed in order to promote differential pressure between the inside and outside of the flexible sleeve 206 when the pressurized fluid flows through the sleeve, causing the sleeve and the integrated energy generation components 208 to flex and bend and generate an electric current. The shape of the cylindrical cavity 204 may further serve as a stop or limit on the expansion of the flexible sleeve 206 protecting the sleeve from bursting and/or over-flexing and causing damage to the integrated energy generation components 208.

Figure 4A:
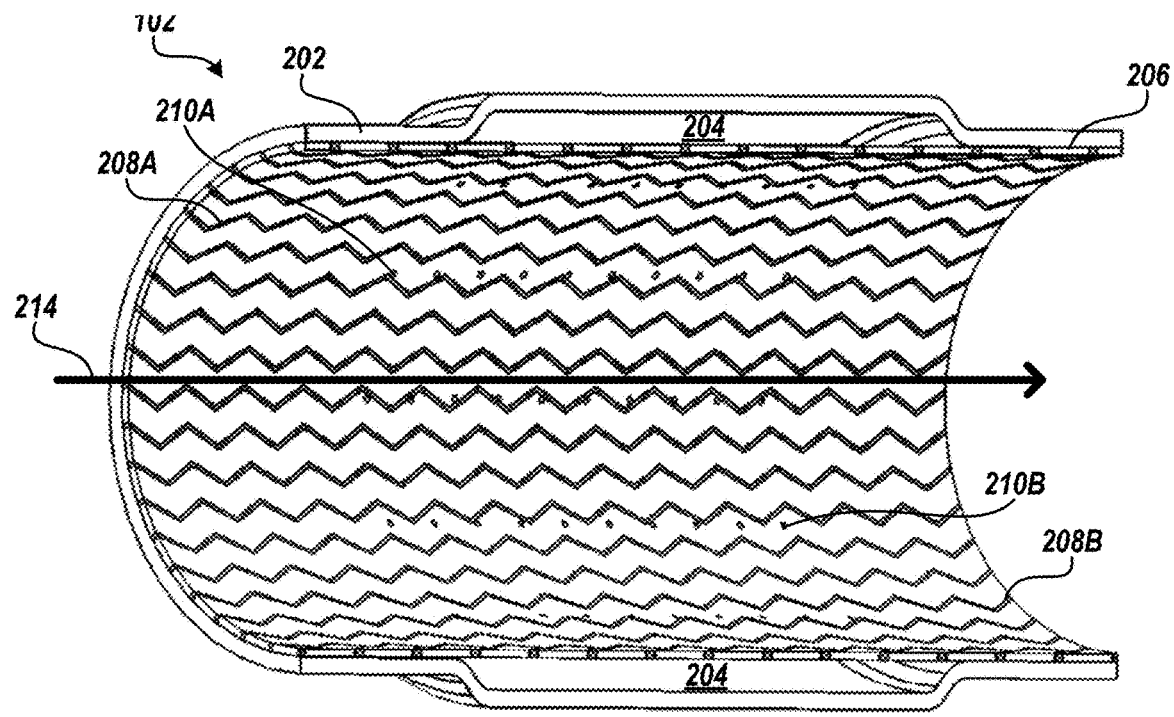
FIGS. 4A and 4B are perspective views showing further details of illustrative solid-state energy harvester devices described in the embodiments presented herein.

In some embodiments, the flexible sleeve 206 incorporates a number of holes, such as holes 210A and 210B (referred to herein generally as "holes 210") that allow fluid to traverse from the fluid path 214 inside the flexible sleeve 206 into and out of the cylindrical cavity 204, thus allowing for a pressure differential to form between the inside and outside of the sleeve. The holes 210 may be molded into or otherwise disposed in the flexible sleeve 206 in a matrix pattern, as shown in FIGS. 2 and 4A, or the holes may be dispersed throughout the sleeve in a pseudo-random pattern. The holes 210 may be sized appropriately to allow traversal of the fluid (e.g., water) into and out of the cylindrical cavity 204 at various pressure differences across the sleeve in order to slow transient pressures in the fluid flowing through the fluid path 214 from entering the cavity. This will cause flex and bending of the flexible sleeve 206 imparting mechanical stresses in the energy generation components 208 integrated in the sleeve to produce electric current.

The use of the holes 210 to establish the pressure differential across the flexible sleeve 206 from transient pressures in the fluid flow allows the solid-state energy harvester 102 to account for a range of average water pressures without the need to adjust parameters or design for different operating pressure ranges. In further embodiments, the holes 210 may be formed and placed in the flexible sleeve 206 to cause turbulence in the flow of the fluid in the fluid path 214 along the inside surface of the sleeve, further exciting the energy generation components 208. The holes 210 may be further sized and formed with additional elements to protect the holes from passing debris into the cylindrical cavity 204 and/or becoming clogged with debris or tuberculation.

Figure 3:
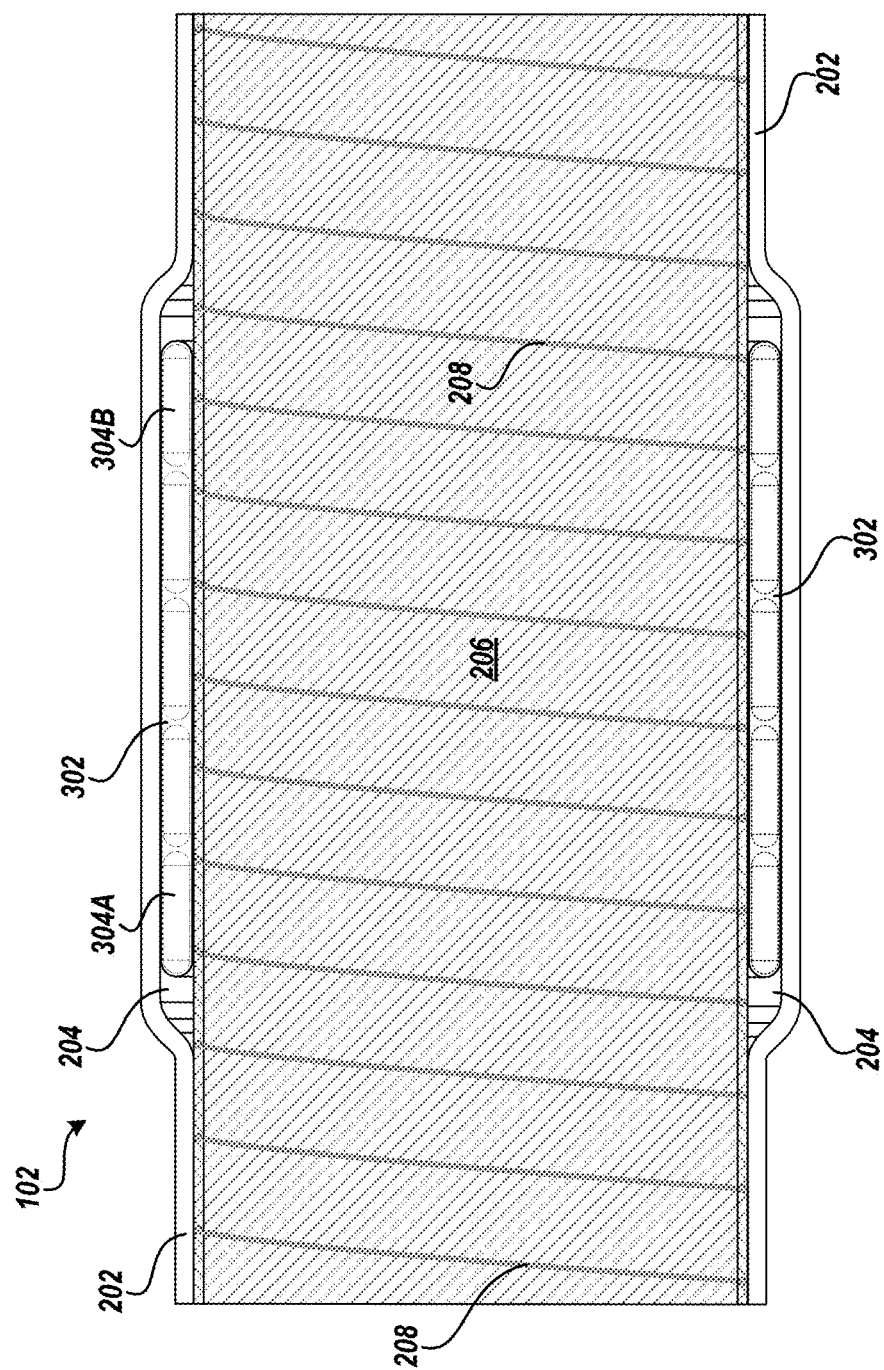
FIG. 3 is a cross-sectional view of an illustrative solid-state energy harvester device incorporating a damper, according to embodiments presented herein.

According to other embodiments, the flexible sleeve 206 may be formed as a watertight element preventing flow of fluid into the cylindrical cavity 204. As shown in FIG. 3, a damper 302 may be disposed in the cylindrical cavity 204 that promotes undulation in the flexible sleeve 206 due to transient pressures in the fluid flowing through the fluid path 214 and generation of energy from the energy generation components 208. As the pressure of the fluid in the fluid path 214 rises, the flexible sleeve 206 expands into the damper 302 exciting the piezoelectric elements of the energy generation components 208 integrated into the sleeve and generating an electric current. This process repeats as the pressure of the fluid falls and the flexible sleeve 206 relaxes.

In some embodiments, the damper 302 may represent a cylindrical "air bag" disposed around the flexible sleeve 206 in the space between the sleeve and the cylindrical body 202 and filled with a compressible or non-compressible liquid or gas. The damper 302 may further be segmented into multiple segments, such as air bag segments 304A and 304B (referred to herein generally as "air bag segments 304"), that may compress and flex somewhat independently, thus promoting further undulation in the flexible sleeve 206 and increased excitation of the energy generation components 208. In other embodiments, the damper 302 may comprise any other compressible or semi-compressible substance or material, such a foam, silicon rubber, gas, or the like, that provides a damping force against the outside wall of the flexible sleeve 206 as the sleeve expands into and contracts out of the cylindrical cavity 204 due the pressure transients in the fluid. The design and materials of the damper 302, including the initial pressurization level of any air bag segments 304, may be tailored to one or more standard average fluid pressures in the pipes, necessitating different solid-state energy harvester 102 devices be produced and configured for specific pipe systems and operating pressures in the water distribution system, for example.

Figure 4B:
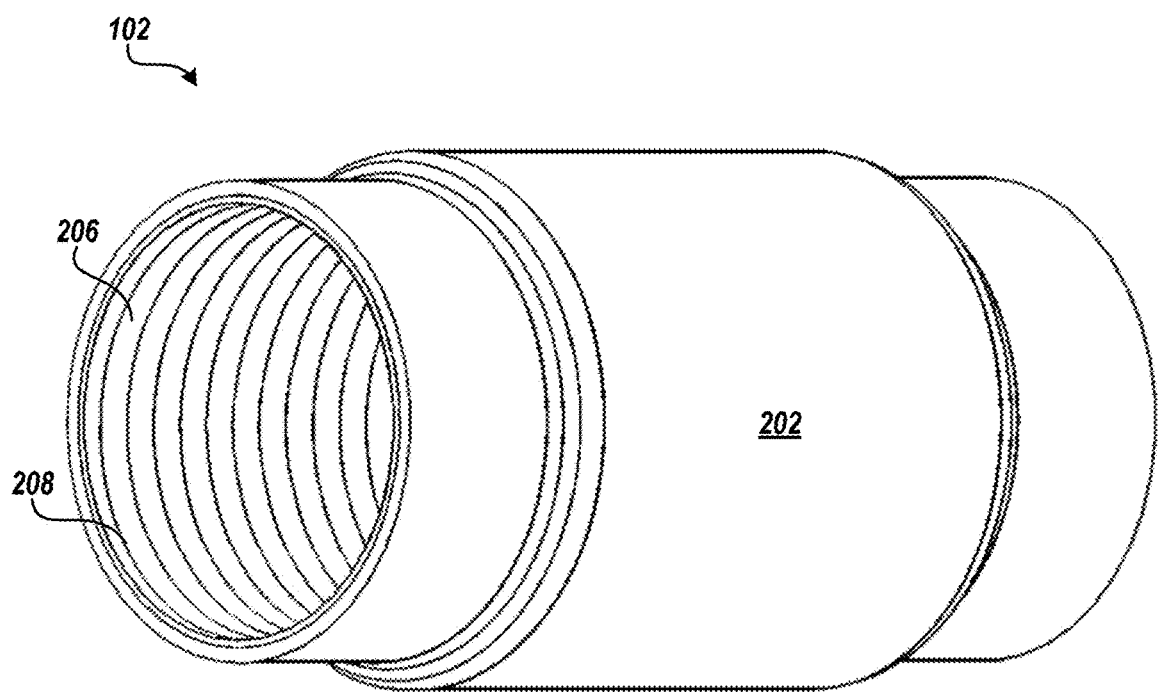

The energy generation components 208 may be integrated into the flexible sleeve 206 in a fashion that maximizes excitation of the piezoelectric elements comprising the components and the resulting energy generation as the flexible sleeve stretches and flexes in a radial direction. For example, as shown in FIGS. 2 and 4A, the energy generation components 208 may be integrated into the flexible sleeve 206 in a zig-zag pattern that maximizes excitation of the embedded piezoelectric elements as the sleeve expands into and contracts out of the cylindrical cavity 204. In other embodiments, the solid-state energy harvester 102 may include one or more linear energy generation components 208 integrated into the flexible sleeve 206 in a spiral pattern, as shown in FIG. 3 and FIG. 4B.

As described above, the individual piezoelectric elements of the energy generation components 208 are interconnected to form electrical pathways between and amongst the elements/components. The electric current generated by the excitation of energy generation components 208 may then flow to a single point and be conducted externally of the solid-state energy harvester 102 by a cable or conductor 106 for provisioning of power to one or more electrical devices 110, as shown in FIG. 1, for, e.g., operation of the devices and/or continuous trickle-charging of batteries to prolong the operational life of the device. As further shown in FIG.

2, the conductor 106 may pass through an aperture 212 in the cylindrical body 202 that is otherwise sealed to prevent water leaks or changes in internal pressure. In other embodiments, the electrical energy may be wirelessly transmitted externally through the iron or plastic cylindrical body 202 by means of inductive or magnetic resonance coupling, for example, thus eliminating a potential leak point in the water distribution system.

Based on the foregoing, it will be appreciated that technologies for utilizing transient pressures inherent in water mains to generate electrical power are presented herein. The above-described embodiments are merely possible examples of implementations set forth for a clear understanding of the principles of the present disclosure. Many variations and modifications may be made to the above-described embodiments without departing substantially from the spirit and principles of the present disclosure. All such modifications and variations are intended to be included within the scope of the present disclosure, and all possible claims to individual aspects or combinations and sub-combinations of elements or steps are intended to be supported by the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

What is claimed is:

1. A solid-state piezoelectric-based energy harvester device comprising:
   a cylindrical body defining a fluid path;
   a flexible sleeve disposed inside the cylindrical body and encompassing the fluid path; and
   a plurality of piezoelectric elements integrated into the flexible sleeve;
   wherein the cylindrical body further defines a cylindrical cavity between a portion of the flexible sleeve and an inside wall of the cylindrical body, the cylindrical cavity configured to promote a pressure differential between an inner surface of the flexible sleeve adjacent to the fluid path and an outer surface of the flexible sleeve adjacent to the cylindrical cavity; and
   wherein the cylindrical body, flexible sleeve, and plurality of piezoelectric elements are configured such that transient pressures in a fluid flowing through the fluid path cause the flexible sleeve to expand into and contract out of the cylindrical cavity, exciting the plurality of piezoelectric elements to produce an electric current.

2. The solid-state piezoelectric-based energy harvester device of claim 1, wherein the flexible sleeve comprises a plurality of holes distributed across the flexible sleeve, the plurality of holes sized and configured to allow the fluid to traverse from the fluid path into the cylindrical cavity and from the cylindrical cavity into the fluid path based on the transient pressures in order to cause the pressure differential.

3. The solid-state piezoelectric-based energy harvester device of claim 1, wherein a damper is disposed inside the cylindrical cavity encompassing the flexible sleeve, the damper configured to cause undulation in the flexible sleeve by providing a damping force against the outer surface of the flexible sleeve as it expands into the cylindrical cavity.

4. The solid-state piezoelectric-based energy harvester device of claim 3, wherein the damper comprises one or more fluid-filled bag segments, an initial pressurization of the one or more fluid-filled bag segments determined by an average operating pressure of the fluid in the fluid path.

5. The solid-state piezoelectric-based energy harvester device of claim 1, wherein the plurality of piezoelectric elements are electrically interconnected and connected to a conductor that passes through the cylindrical body to supply the electric current to an external electrical device.

6. The solid-state piezoelectric-based energy harvester device of claim 1, wherein the flexible sleeve is overmolded over the plurality of piezoelectric elements.

7. The solid-state piezoelectric-based energy harvester device of claim 1, wherein the plurality of piezoelectric elements are disposed on an outer surface of the flexible sleeve.

8. The solid-state piezoelectric-based energy harvester device of claim 1, wherein the plurality of piezoelectric elements are integrated into the flexible sleeve in a zig-zag pattern.

9. The solid-state piezoelectric-based energy harvester device of claim 1, wherein the plurality of piezoelectric elements are integrated into the flexible sleeve in a spiral pattern.

10. The solid-state piezoelectric-based energy harvester device of claim 1, wherein the cylindrical body is configured to be installed inline with a water main of a water distribution system.

11. An apparatus comprising:
    a cylindrical body defining a fluid path and configured to be installed inline in a fluid-carrying pipe system;
    a flexible sleeve disposed inside the cylindrical body and encompassing the fluid path, the cylindrical body further defining a cylindrical cavity between a portion of the flexible sleeve and an inside wall of the cylindrical body, the cylindrical cavity configured to promote a pressure differential between an inner surface of the flexible sleeve adjacent to the fluid path and an outer surface of the flexible sleeve adjacent to the cylindrical cavity; and
    one or more electrically-interconnected energy generation components integrated into the flexible sleeve;
    wherein the cylindrical body, the flexible sleeve, and the one or more energy generation components are configured such that transient pressures in a fluid flowing through the fluid path cause the flexible sleeve to expand into and contract out of the cylindrical cavity imparting mechanical stresses in the one or more energy generation components causing the one or more energy generation components to produce an electric current.

12. The apparatus of claim 11, wherein the flexible sleeve comprises a plurality of holes distributed across the flexible sleeve, the plurality of holes sized and configured to allow the fluid to traverse from the fluid path into the cylindrical cavity and from the cylindrical cavity into the fluid path based on the transient pressures in order to cause the pressure differential.

13. The apparatus of claim 11, wherein a damper is disposed inside the cylindrical cavity encompassing the flexible sleeve, the damper configured to cause undulation in the flexible sleeve by providing a damping force against the outer surface of the flexible sleeve as it expands into the cylindrical cavity.

14. The apparatus of claim 11, wherein the one or more energy generation components integrated in the flexible sleeve comprise a plurality of interconnected piezoelectric elements overmolded by the flexible sleeve.

15. The apparatus of claim 11, wherein the one or more energy generation components integrated in the flexible sleeve comprise one or more of interconnected piezoelectric film sheets and piezoelectric fibers comprising a structure of the flexible sleeve.

16. The apparatus of claim 11, wherein the one or more electrically-interconnected energy generation components are further connected to a conductor that passes through the cylindrical body to supply the electric current to an external electrical device.

17. A method for utilizing a solid-state energy harvester to provide an electric current to an external electrical device, the method comprising:
  installing the solid-state energy harvester inline with a fluid-carrying pipe system, the solid-state energy harvester comprising:
    a cylindrical body defining a fluid path for conducting the fluid through the cylindrical body, each end of the cylindrical body configured to be connected to pipes of the fluid-carrying pipe system,
    a flexible sleeve disposed inside the cylindrical body and encompassing the fluid path, the cylindrical body further defining a cylindrical cavity between a portion of the flexible sleeve and an inside wall of the cylindrical body, the cylindrical cavity configured to promote a pressure differential between an inner surface of the flexible sleeve adjacent to the fluid path and an outer surface of the flexible sleeve adjacent to the cylindrical cavity,
    one or more electrically-interconnected energy generation components integrated into the flexible sleeve, and
    an electrical conductor connected to the one or more energy generation components and passing through the cylindrical body;
  connecting the electrical conductor to the external electrical device to conduct the electric current from the one or more energy generation components to the external electrical device; and
  causing pressurized fluid to flow through the fluid-carrying pipe system, wherein transient pressures in the fluid flowing through the fluid path cause the flexible sleeve to expand into and contract out of the cylindrical cavity imparting mechanical stresses in the one or more energy generation components causing the energy generation components to produce the electric current.

18. The method of claim 17, wherein a damper is disposed inside the cylindrical cavity encompassing the flexible sleeve, the damper comprising one or more fluid-filled bag segments configured to cause undulation in the flexible sleeve by providing a damping force against the outer surface of the flexible sleeve as it expands into the cylindrical cavity, an initial pressurization of the fluid-filled bag segments determined by an average operating pressure of the fluid in the pipe system.

19. The method of claim 17, wherein the pipe system comprises a water main of a water distribution system and the external electrical device is a component of the water distribution system.

* * * * *